July 7, 1959

J. OPPELT 2,894,142

APPARATUS FOR ASCERTAINING THE ANODE
TEMPERATURE OF AN X-RAY TUBE

Filed Aug. 14, 1956

INVENTOR.
Jiří Oppelt
BY

United States Patent Office 2,894,142
Patented July 7, 1959

2,894,142

APPARATUS FOR ASCERTAINING THE ANODE TEMPERATURE OF AN X-RAY TUBE

Jiří Oppelt, Prague, Czechoslovakia

Application August 14, 1956, Serial No. 603,895

2 Claims. (Cl. 250—83.6)

During the operation of an X-ray tube, it is very important to protect the tube from too high temperatures, particularly from overloading of its anode. For this purpose, several protective circuit arrangements have been proposed in the past wherein the voltage, the current, and the duration of exposure combined together are effective in such a manner that overloading is prevented. The known circuit arrangements, however, are reliable only for a single exposure; the conditions of the tube before exposure are not taken into consideration. Consequently, a succession of exposures following closely one another may lead to the destruction of the tube, although each single exposure is effected within the range of a permissible loading. Therefore, the operation of such an X-ray tube is made rather difficult if several exposures have to be effected. In order to avoid this difficulty, many other protective devices have been proposed which utilize the effect of heat expansion and actuate corresponding signalling or switching devices. However, in view of the fact that each heat expansion takes place with a rather long delay, the known devices are not suited to prevent a dangerous overheating of the anode.

The present invention overcomes the mentioned difficulties in a simple manner. The principle underlying the invention is to be seen in that the temperature conditions at the anode, i.e. at the focal spot produced at its surface, are measured indirectly by utilizing the X-ray radiation emanating from the focal spot. This principle is realised in such a manner that an ionization current, produced by the radiation of the X-ray tube, influences a circuit in such a manner that the voltage of this circuit corresponds to the instantaneous temperature at the anode. As a device for ascertaining the X-ray radiation, an ionization chamber is used.

In order to obtain accurate data in respect of the instantaneous temperature of the anode, also with regard to the rate of increase or decrease of temperature as a function of time, the time constants of the circuit are matched to the time constants of the anode. For this purpose, capacitors may be used, if desired in combination with linear and non-linear resistors, and the circuit may also function as a discharge circuit.

Several constructional examples of the invention are represented schematically in the attached drawings, wherein:

Fig. 3 is a modification of the circuit arrangement which is combined with an indication device and with an additional circuit, while

Figure 1:
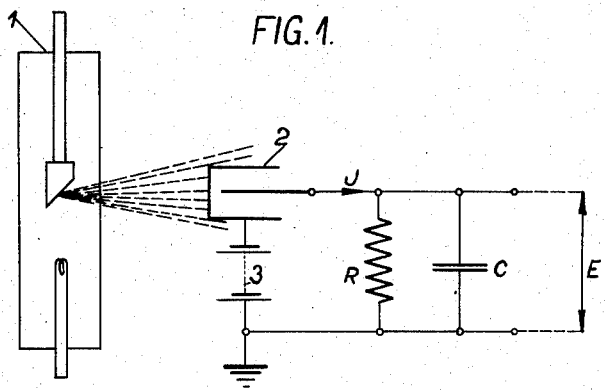
Fig. 1 represents the simple principle of the circuit arrangement.

As shown in Fig. 1 an ionization chamber 2 is exposed to the X-ray beam of an X-ray tube 1, which chamber comprises two outer electrodes and one inner electrode. The outer electrodes are connected together and to a terminal of a battery 3, the other terminal of the latter being connected to earth. The inner electrode is connected to a parallel connection of a resistor R and a capacitor C. In this way a discharge circuit is in fact obtained which is supplied with the ionization current I during the operation of the X-ray tube. The conditions are made such that the voltage E corresponds to the temperature of the anode.

When the X-ray tube is switched off, the radiation from the anode immediately ceases, but only a slow cooling of the anode takes place. At the instant of switching off, the ionization current like-wise ceases and the discharging action in the circuit comprising the resistor R and the capacitor C commences. At the same time also the voltage E gradually decreases; its magnitude decreases at the same rate as the temperature at the anode decreases. When thereafter, the X-ray tube is switched on again, the ionization current I is immediately produced and the voltage E indicates the temperature at the anode.

The control of the X-ray tube may be effected in direct dependence on the varying voltage E; for instance at a comparatively high voltage E, a main switch may be actuated, a succeeding exposure may be interrupted, and so on.

Figure 2:
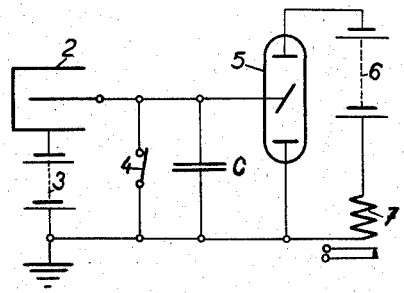
Fig. 2 shows a circuit arrangement with indirect signalling.

The modification shown in Fig. 2 represents an example with indirect signalling. The varying voltage E is applied in this case to the ignition electrode of a discharge lamp 5. In the circuit of this discharge lamp, a signalling relay 7 and a battery 6 are provided. The lamp 5 ignites when the voltage E has reached a certain value, with the result that the signalling relay 7 operates and the desired switching actions are effected.

The rate of cooling of the anode is also dependent on the construction of the anode and the means for its fastening. Consequently the herein before described circuit arrangement with a single resistor and capacitor can only represent the course of the cooling in an approximate manner, and the difference between the instantaneous values of the voltage E and the actual temperatures at the anode may still be considerable.

Figure 3:
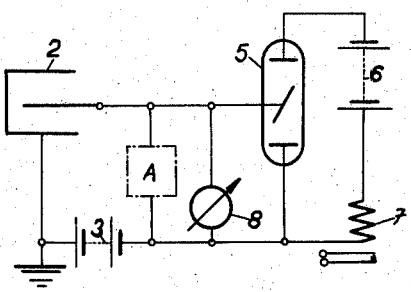
Figure 4:
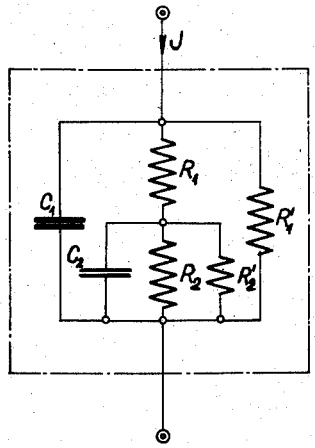
Fig. 4 represents an example of such an additional circuit.

In order to overcome this limitation, several discharge circuits with suitable combinations of parallel and series connected resistors and capacitors are used according to the invention. An example of such a combination is represented in Fig. 4. The magnitudes of the capacitors $C_1$, $C_2$ and of the resistors $R_1$, $R_1'$, $R_2$ and $R_2'$ are adapted to the construction of the anode and to the construction of its supporting means. If required, non-linear variable resistors may be used. These members may be combined to form a unit "A" as required by the X-ray tube in question. The unit "A" is then inserted in the circuit of the ionization chamber 2 shown for instance in Fig. 3. This circuit connection makes use not only of the indirect signalling by means of a discharge lamp 5 as described hereinbefore, but also of a measuring device 8, for example, a static voltmeter, for the direct indication of the voltage E, i.e. of the instantaneous anode temperature.

It will be appreciated that any of the known indicators, measuring apparatus, switches, signalling devices and the like may be combined with the circuit arrangements according to the invention without affecting the function and performance of the ionization chamber.

I claim:

1. In a system for protecting against overheating of the anode of an intermittently operated X-ray tube; the combination of an X-ray tube, an ionization chamber exposed to the radiation of said X-ray tube, a source of electric potential, a discharge circuit including capacitance and resistance elements and having said ionization chamber interposed therein and connected to said source to be charged with an electric current from said source which depends upon the radiation received by said ionization during operation of the X-ray tube, said discharge circuit discharging during the intervals between successive periods of operation of the X-ray tube at a rate determined by said capacitance and resistance elements to be the same as the rate of cooling of the anode of the X-ray tube so that the voltage across said discharge circuit during charging and discharging thereof always corresponds to the actual heat conditions of the anode of the X-ray tube, said discharge circuit having an output, and means connected to said output and influenced by said voltage across said discharge circuit to indicate the actual temperature of the anode of the X-ray tube.

2. In a system for protecting against overheating of the anode of an X-ray tube; the combination as in claim 1, wherein said discharge circuit includes parallel and series connected capacitance elements and resistance elements representing non-linear rates of heating and cooling of the anode of the X-ray tube.

References Cited in the file of this patent

UNITED STATES PATENTS

| | | |
|---|---|---|
| 2,420,844 | Slack | May 20, 1947 |
| 2,503,075 | Smith | Apr. 4, 1950 |
| 2,537,914 | Roop | Jan. 9, 1951 |
| 2,573,596 | Offner | Oct. 30, 1951 |
| 2,652,497 | Miller | Sept. 15, 1953 |